United States Patent [19]
Rosenberg et al.

[11] Patent Number: 5,797,978
[45] Date of Patent: Aug. 25, 1998

[54] AIR FILTER INCLUDING ELECTROSTATIC PRECIPITATION, AND METHOD OF OPERATING SAME

[76] Inventors: Gideon Rosenberg, 20 Hanna Senesh Street, Tivon 36000, Israel; Ilan Leskly, 12830 Hanover St., Los Angeles, Calif. 90049

[21] Appl. No.: 563,092

[22] Filed: Nov. 27, 1995

[30] Foreign Application Priority Data

Dec. 6, 1994 [IL] Israel ................................. 111901

[51] Int. Cl.$^6$ ............................................. B03C 3/40
[52] U.S. Cl. .................... 95/74; 95/75; 96/44; 96/50; 96/87; 96/88
[58] Field of Search ........................ 96/86–88, 69, 96/43–50; 210/748, 243; 95/59, 78, 74, 75, 280, 281; 60/275; 55/302, 242

[56] References Cited

U.S. PATENT DOCUMENTS

| | | | |
|---|---|---|---|
| 2,868,319 | 1/1959 | Rivers | 96/67 |
| 2,974,747 | 3/1961 | Coolidge, Jr. et al. | 96/69 |
| 2,978,066 | 4/1961 | Nodolf | 96/87 |
| 3,805,492 | 4/1974 | King | 96/87 X |
| 4,661,250 | 4/1987 | Rosenberg | 210/352 |
| 4,740,302 | 4/1988 | Rosenberg | 210/392 |
| 5,171,433 | 12/1992 | Rosenberg | 210/108 |

*Primary Examiner*—Richard L. Chiesa
*Attorney, Agent, or Firm*—Benjamin J. Barish

[57] ABSTRACT

An air filter body includes a plurality of discs of electrically insulating material arranged in a stack and having ribbed contacting faces defining small filtering passageways between the contacting faces of adjacent discs. Each disc has an electrode layer insulated by the respective disc from the electrodes of the adjacent discs. Each electrode is electrically connected to an electrical terminal at an edge of the respective discs. Electrical conductors connect the electrical terminals of alternating discs to one side of a voltage source, and the electrical terminals of the remaining alternating discs to the other side of the voltage source.

18 Claims, 3 Drawing Sheets

FIG. 2
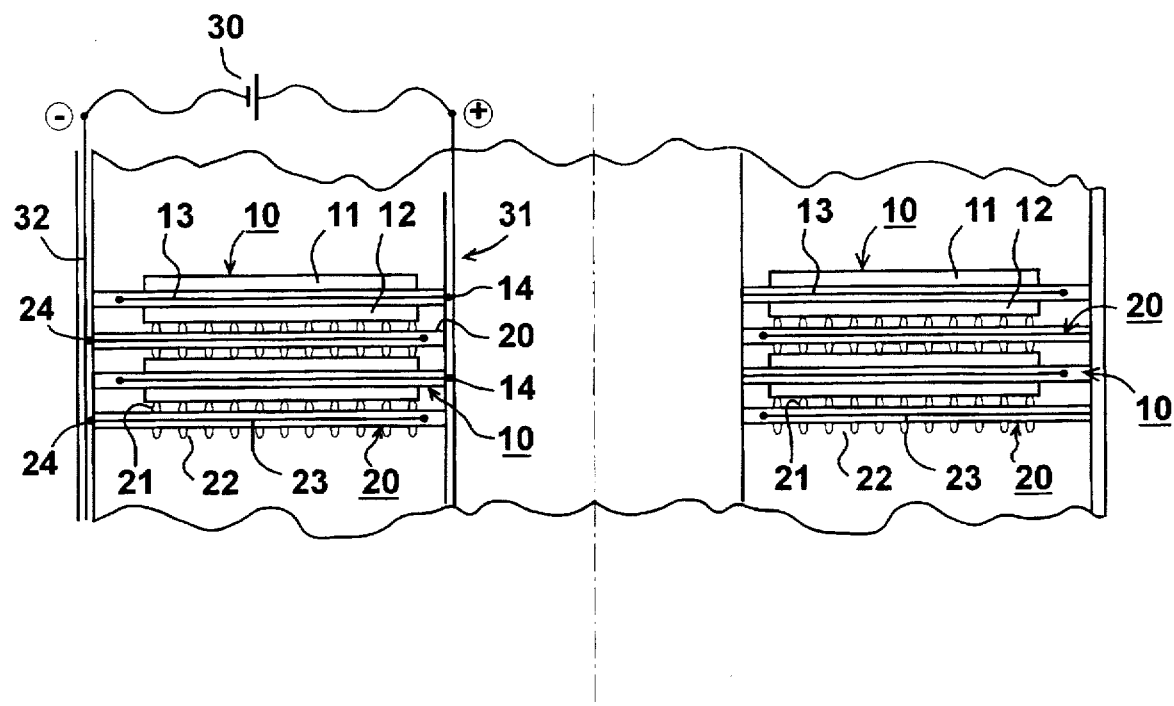
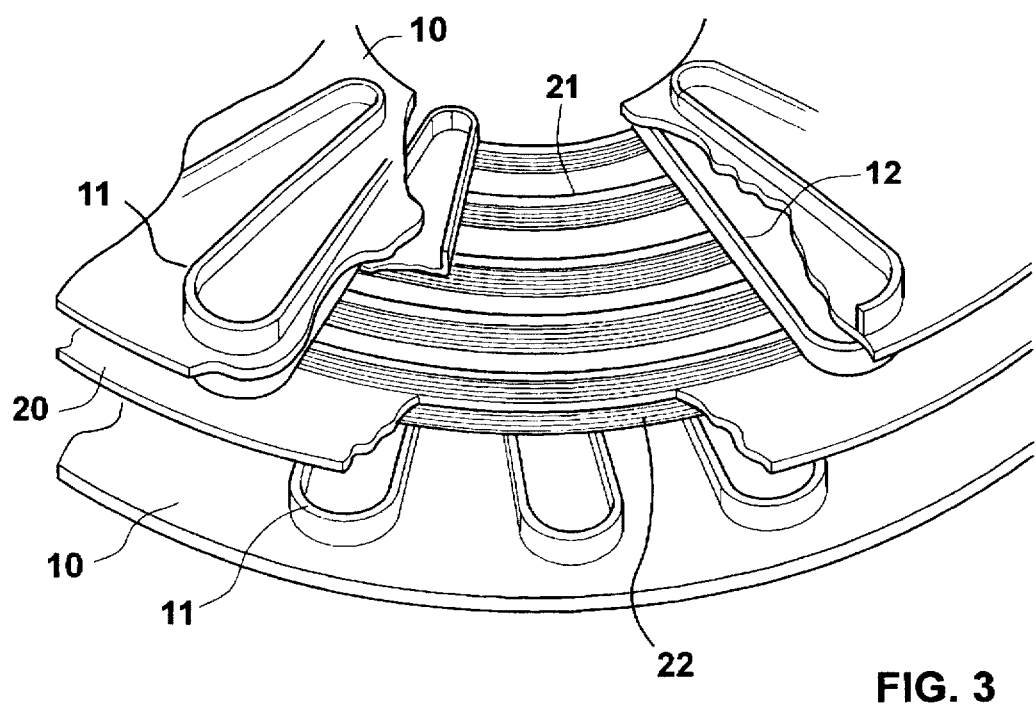
FIG. 3

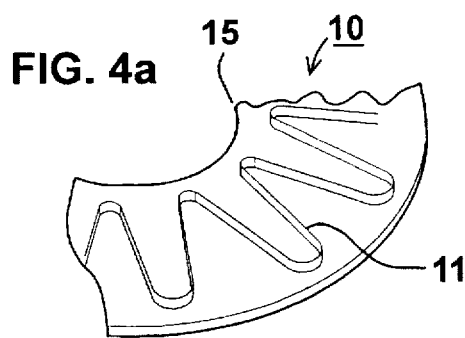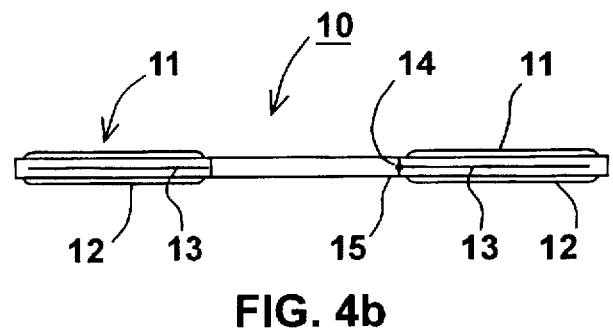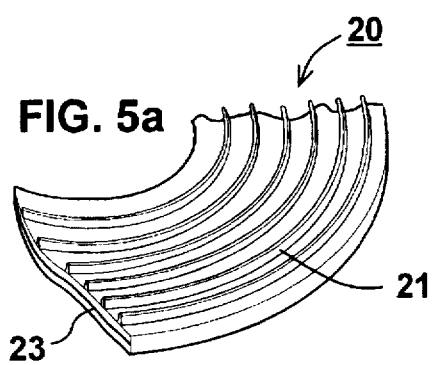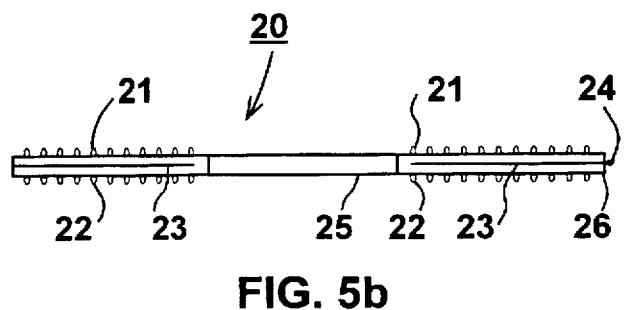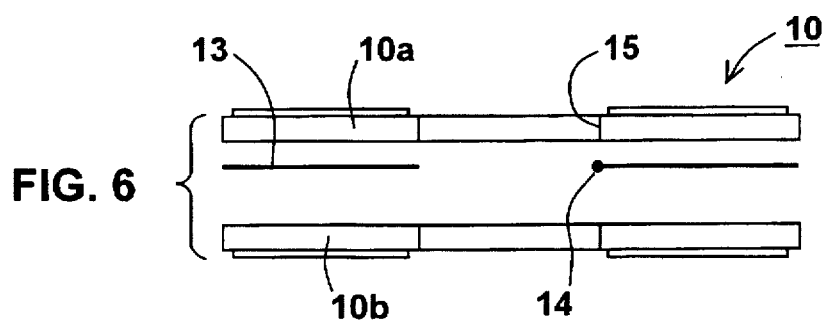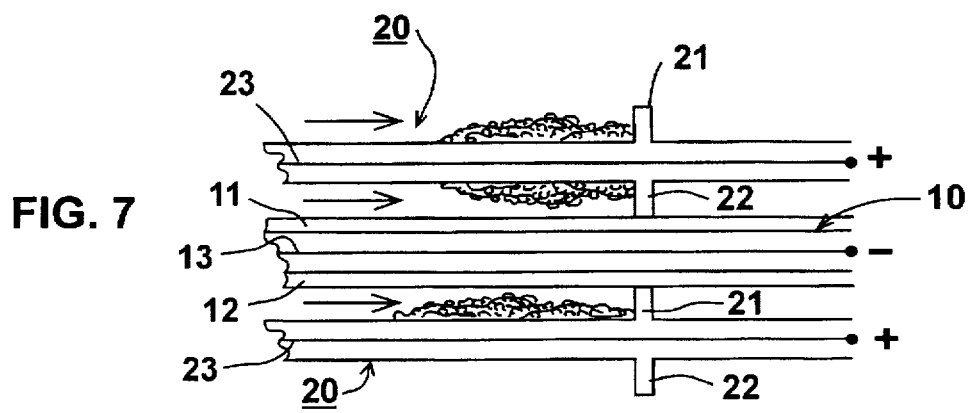

AIR FILTER INCLUDING ELECTROSTATIC PRECIPITATION, AND METHOD OF OPERATING SAME

FIELD AND BACKGROUND OF THE INVENTION

The present invention relates to air filters for removing solid particles (e.g., dust) from air or other gases. The invention particularly relates to an air filter body of novel construction, a filter element included in such a filter body, and a method of operating an air filter incorporating the novel filter body, during both a filtering mode and a cleaning mode.

The term "air filter" as used herein is intended to include filters not only for air, but also for other gases.

One of the largest applications for air filters at the present time is for cleaning the air supplied to internal combustion engines and air compressors. The most common type of air filter used for engines is the paper filter, made up of multiple layers of paper or other fiber. However, for the filter to remove small particles, the through passageways defined by the multiple fiber layers must be very small. This produces a relatively large resistance to the air flow through the filter, which resistance increases with the accumulation of dirt particles in the filter. Such resistance to air flow not only decreases the efficiency of the system, but also imposes large forces on the filter itself which can result in its rupture. In addition, such filters generally are difficult to clean and are therefore usually discarded after a single or double use. Further, the dirt-holding capacity of such filters is very limited so that the filters must be frequently replaced particularly where the filters are used in a very dusty environment, such as in the desert, mining, road construction, etc.

Another type of filter used for air cleaning, particularly in applications involving a large air flow, is the electrostatic precipitator filter. This filter includes spaced electrodes containing opposite electrical charges so as to attract, to one of the electrodes, particles in the air passing in the space between the electrodes. Such electrostatic precipitators, however, generally require relatively large spacings between the electrodes plates to prevent voltage breakdown, and therefore do not remove all the particles (i.e., above a predetermined particle size) from the air passing through the filter. Also, in the event of an interruption of the power supply, the precipitator ceases to function, and the particles will pass through it. Moreover, such filters generally require a relatively large volume for their design, and therefore they are currently used mostly in large installations, such as power plants.

Another type of filter is known, called the disc filter, widely used for removing solid particles from liquids, such as from water supplied to a water irrigation system. This type of filter includes a plurality of discs arranged in a stack and having ribbed contacting faces defining small filtering passageways between the contacting faces of adjacent discs. The sizes of the passageways determine the sizes of the particles blocked. The particles blocking such passageways remain in them and thereby increase the resistance of the filter to the flow of the fluid therethrough until the particles are removed by cleaning, e.g., by reverse flushing.

Many filter designs of this type are known and are used for removing solid particles from water or other liquids. Examples are described in U.S. Pat. Nos. 4,661,250, 4,740,302 and 5,171,433. Insofar as we are aware, however, such disc-type filters have been used mostly or exclusively for removing solid particles from water or other liquid, and not dust or other solid particles from air or other gases.

OBJECTS AND BRIEF SUMMARY OF THE INVENTION

An object of the present invention is to provide an air filter of a novel construction and having advantages in the above respects.

According to one aspect of the present invention, there is provided an air filter body comprising a plurality of discs of electrically insulating material arranged in a stack and having ribbed contacting faces defining small filtering passageways between the contacting faces of adjacent discs. Each of the discs has an electrode layer insulated by the respective disc from the electrodes of the adjacent discs. Each of the electrodes is electrically connected to an electrical terminal at an edge of the respective discs. Electrical conductors connect the electrical terminals of alternating discs to one side of a voltage source, and the electrical terminals of the remaining alternating discs to the other side of the voltage source.

As will be apparent from the description below, an air filter body constructed in accordance with the foregoing features exploits the advantages of both the disc-type filter and the electrostatic precipitator filter, and therefore may be considered to be a "hybrid" filter. Such a filter has a high particle-retaining capacity as the electric field causes most of the particles to accumulate on the flat surfaces of the discs and not to block the passageways. The filter therefore exhibits a low resistance to air flow not only when the filter is relatively clean, but also after it has accumulated a relatively large quantity of the solid particles removed from the air. Such a filter also effectively removes the particles down to the smallest size of the passageways. Further, in the event of a failure of the power supply, passage of the solid particles through the filter is blocked by the narrow passageways, thereby providing a more "fail safe" operation, as compared for example to the electrostatic precipitator filter. The filter body is also of a sturdy construction providing relatively reliable operation.

A still further advantage of the novel "hybrid" filter is that it may be more effectively cleaned than, for example, the disc type filter. Thus, during a cleaning mode, the electrical voltage applied to the terminals of the discs may be reversed, thereby to expel the particles from the contacting faces of the filter body discs and to enhance their removal during reverse flushing of the discs.

The invention also provides a novel filter element for use in the air filter body set forth above, a novel air filter device including the novel air filter body, and a method of operating the novel air filter device during a filtering mode for removing solid particles from air, and during a cleaning mode for cleaning the filter body of the solid particles accumulated therein.

Further features and advantages of the invention will be apparent from the description below.

BRIEF DESCRIPTION OF THE DRAWINGS

The invention is herein described, by way of example only, with reference to the accompanying drawings, wherein:

FIG. 2 is an enlarged fragmentary view more particularly illustrating the construction of the air filter body in the filter of FIG. 1;

3

Figure 1:
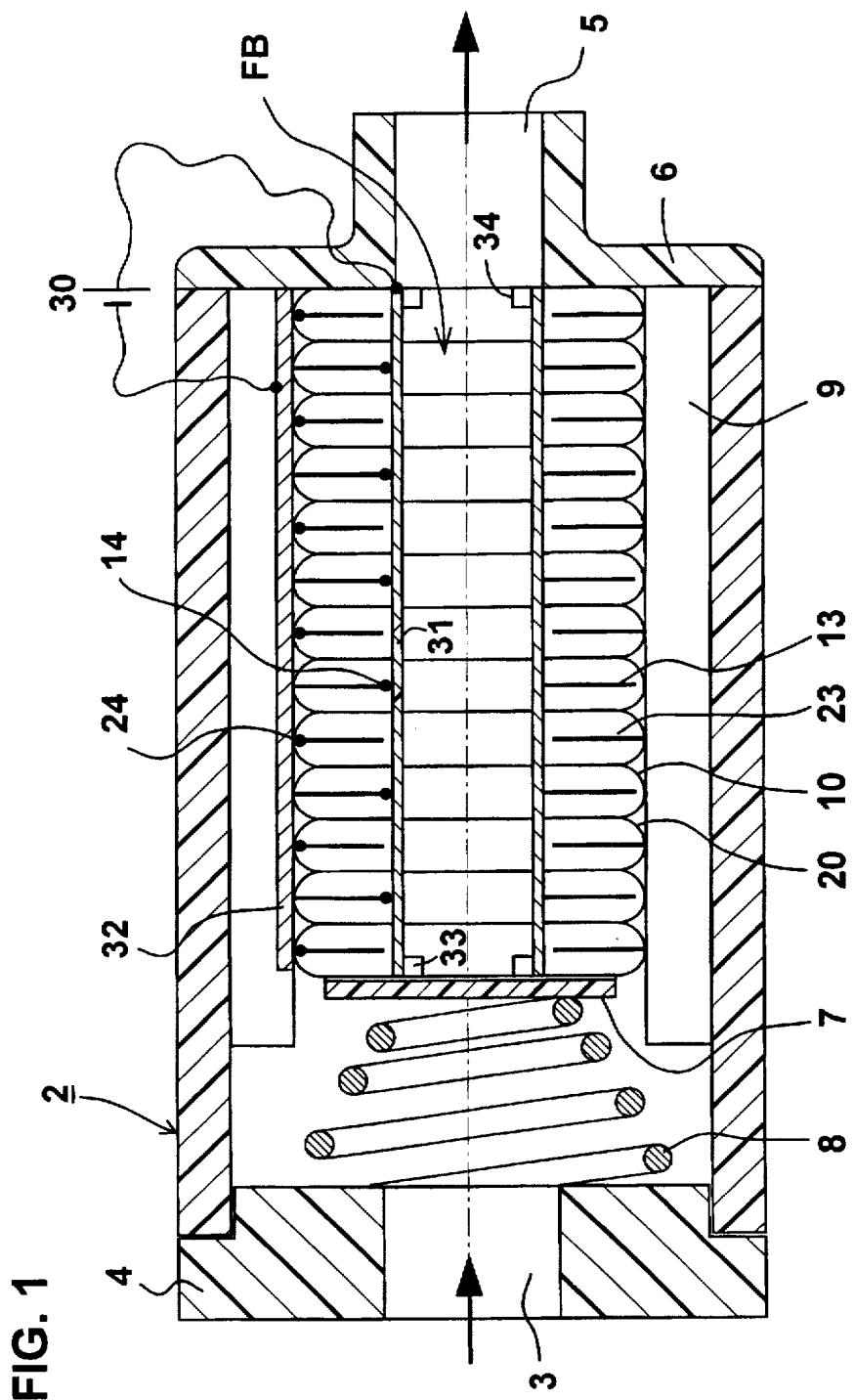
FIG. 1 is a longitudinal sectional view illustrating one form of air filter constructed in accordance with the present invention.

FIG. 3 is an enlarged, perspective, fragmentary view illustrating the two types of filter discs included in the filter body of FIG. 2;

FIGS. 4a and 4b are perspective and sectional views, respectively, illustrating the structure of one type of filter disc in the filter body of FIG. 2;

FIGS. 5a and 5b are perspective and sectional views, respectively, illustrating the other type of filter disc included in the filter body of FIG. 2;

FIG. 6 illustrates one manner of producing the filter discs in the filter body of FIG. 2;

and FIG. 7 illustrates the manner in which the filter body of FIG. 2 removes the solid particles from the air.

DESCRIPTION OF A PREFERRED EMBODIMENT

For purposes of example, the filter illustrated in FIG. 1 of the drawings and described herein is similar to the multiple-disc filter described in the above-cited U.S. Pat. No. 4,661, 250, but modified in accordance with the present invention to adapt it for use in removing dust particles or other relatively small particles from air or other gases. It will be appreciated that this type of multiple-disc filter is described herein only for purposes of example, and that the invention could be advantageously used in many other types of filter constructions.

The filter illustrated in FIG. 1 includes a cylindrical housing 2 having an inlet 3 formed in a cap 4 closing one end of the housing, and an outlet 5 formed in an end wall 6 closing the opposite end of the housing. Disposed within the housing is a filter body, generally designated FB, including a stack of filter discs of annular configuration, i.e., formed with a central opening. A non-apertured disc 7 is urged by a spring 8 to close the front end of the stack. The inner surface of housing 2 is formed with a plurality of axially-extending, circumferentially-spaced ribs 9, so that the air inletted via inlet 3 is forced to flow in the annular region around the filter body FB, radially between the contacting faces of the filter discs in the filter body, and out through outlet 5.

Filter body FB includes a stack of two types of discs, generally designated 10 and 20, respectively, in alternating relation in the stack, as shown particularly in FIGS. 2 and 3. The construction of filter disc 10 is more particularly illustrated in FIGS. 4 and 4b, and the construction of filter disc 20 is more particularly illustrated in FIGS. 5 and 5b.

As shown in FIGS. 4a and 4b, filter disc 10 is of annular configuration, and includes substantially planar faces on its opposite sides each formed with a sinuous rib 11, 12. The disc is made of electrically insulating material, such as a suitable plastic material. It includes an electrode layer 13 embedded in the disc so as to be electrically insulated from the adjacent discs of the stack except for an electrical terminal 14 connected to the electrode and exposed at the inner edge 15 of the disc. Electrodes 13 in discs 10 are also substantially planar and extend substantially for the complete area of the two faces of the disc formed with the sinuous ribs 11, 12.

The structure of the second type of filter disc, disc 20 included in the filter body stack FB is more particularly illustrated in FIGS. 5 and 5b. It is also in the form of an annular disc of insulating material of the same dimensions as disc 10, but in this case it is formed on its opposed substantially planar faces with a plurality of concentric annular ribs 21, 22 of increasing diameter from the inner edge 25 to the outer edge 26. Discs 20 also include an electrode layer 23 of planar configuration and extending for substantially the complete area of the ribbed face of the disc, and electrically insulated from adjacent discs in the stack, except for an electrical terminal 24 electrically connected to

4 the electrode, but in this case the electrical terminal is exposed on the outer face 26 of the disc.

As shown particularly in FIG. 3, each pair of contacting faces of the discs in the stack include a sinuous rib (11, 12) of disc 10 and an annular rib (21, 22) of disc 20. The main portions of the sinuous ribs 11, 12 extend substantially radially of their respective discs, whereas the annular ribs 21, 22 of discs 20 extend circularly around the disc. Accordingly, the annular ribs cross the sinuous ribs at substantially right angles, to define small filtering passageways between the ribs. It will be seen that each such filtering passageway has a height equal to the height of the sinuous ribs 11, 12, a length equal to the distance between the sinuous ribs 11, 12 and a breadth equal to the thickness of the annular ribs 21, 22.

The illustrated filter further includes a DC voltage source 30 electrically connected to the electrodes 13 and 23 of the filter discs 10 and 20, respectively. Thus, the plus terminal of battery 30 is connected by electrical conductor 31 to terminals 14 of the electrodes 13 in the discs 10, whereas the minus terminal of battery 30 is connected by electrical conductor 32 to terminals 24 of electrodes 23 in discs 20 alternating with discs 10. It will be appreciated that the connections to be battery 30 as illustrated in FIGS. 1 and 2 could be reversed.

As shown in FIG. 1, electrical conductor 32 is carried by one of the axially-extending ribs 9 formed on the inner face of the housing 2 so that it engages all the terminals 24 on the outer edges of the alternating discs. The inner electrical conductor 31 is shown in FIG. 1 as being supported on an annular rib 33 formed on end disc 7 and another annular rib 34 formed on the inner surface of the housing 2 around the outlet 5, such that electrical conductor 31 contacts the terminals 14 on the inner edges of the remaining alternate discs.

FIG. 6 illustrates one way of incorporating the electrodes within their respective discs. Thus, the electrode 13 is sandwiched between two disc sections 10a, 10b bonded to each other so that the electrode is completely embedded within the disc, and only its terminal 14 is exposed at the inner edge 15 of the disc. It will be appreciated that the same technique can be used for incorporating electrodes 23 within their discs. It will also be appreciated that other techniques could be used, for example plating the electrode layer on a disc section and then bonding the other section thereto.

The described filter thus removes the solid particles in the air by both a mechanical filtration action and an electrostatic precipitation action. The air inletted via inlet 3 is directed by the non-apertured end disc 7 to the outer annular region between the filter body FB and the inner surface of the housing 2, through the axial passages defined by the axial ribs 9, and then radially between the contacting faces of the filter discs 10, 20 in the filter body FB, and out through the outlet 5. The narrow filtering passageways described above between the sinuous ribs 11, 12 of the filtering discs 10, and the annular ribs 21, 22 of the filtering discs 20, prevent solid particles in the air stream from flowing through the filter body FB. In addition, the electrostatic field produced between the negatively-charged electrodes 13 in discs 10 and the positively-charged electrodes 23 in discs 20 attract the dirt particles to the surface of discs 20, as shown in FIG. 7, where they tend to accumulate on the inlet sides of the annular ribs 21, 22. The particles are thus removed before they reach the small filtering passageways, and therefore do not block the passageways nor increase the flow resistance through the passageways. However, should there be a failure of the power supply, the filtering passageways will be effective to block the particles from reaching the outlet.

The filter may be cleaned whenever desired by directing air from the outlet 5 towards the inlet 3, thereby reverse-flushing the filter body FB. At the same time the filter body is reversed-flushed, the electrical connections to the electrodes 13, 23 may be reversed so that the electrostatic field produced by these electrodes will now repel the particles from the surfaces to which they had been attracted, thereby enhancing the reverse flushing of the filter body.

The air supply used for reversely-flushing the filter may be from a separate source of compressed air, e.g., supplied by a tank of compressed air. The filter body may also be cleaned by reversely-flushing it first with steam or a spray of liquid droplets before reversely-flushing it with air.

It will be seen that the filter illustrated provides a sturdy construction, is reliable in operation, efficiently removes even small particles from the air, provides a large particle-retaining capacity for its size, introduces a low resistance to the air flow through the filter body even when a relatively large quantity of dirt particles have accumulated, provides a "fail safe" operation in the event of power failure, and permits efficient cleaning of the filter whenever desired.

As indicated earlier, while the invention has been described with respect to one preferred embodiment, it it to be appreciated that this embodiment is set forth merely for purposes of example, and that many other variations, modifications and applications of the invention may be made.

We claim:

1. An air filter body, comprising: a plurality of discs of electrically insulating material arranged in a stack and having ribbed contacting faces defining small filtering passageways between the contacting faces of adjacent discs; each of said discs having an electrode layer insulated by the respective disc from the electrodes of the adjacent discs; each of said electrodes being electrically connected to an electrical terminal at an edge of the respective discs; and electrical conductors for connecting the electrical terminals of alternating discs to one side of a voltage source, and the electrical terminals of the remaining alternating discs to the other side of said voltage source.

2. The filter body according to claim 1, wherein said electrodes are substantially planar and extend for substantially the complete area of the ribbed faces of their respective discs.

3. The filter body according to claim 1, wherein the ribs in one disc face of each pair of contacting faces extend substantially perpendicularly to the ribs of the other disc face of the pair of contacting faces.

4. The filter body according to claim 1, wherein said discs are of annular configuration; the electrical terminals of alternating discs being on the inner edges of their respective discs, and the electrical terminals of the remaining alternating discs being on the outer edges of their respective discs.

5. The filter body according to claim 4, wherein the ribs in one disc face of each pair of contacting faces are of sinuous configuration having their major portions extending substantially radially of the respective disc, and the ribs in the other disc face of the pair of contacting faces are of annular configuration to extend substantially perpendicularly to said major portions of the sinuous ribs in said one disc face.

6. The filter body according to claim 5, wherein alternate discs are formed with said sinuous ribs on both faces, and the remaining alternate discs are formed with said annular ribs on both faces.

7. The filter body according to claim 1, wherein said electrodes are embedded in their respective discs.

8. An air filter device, comprising: a housing having an inlet and an outlet; a filter body according to claim 1, within said housing for filtering the air fed into the inlet before discharging the air through the outlet; and an electrical voltage source connected to said terminals of the electrodes in the insulating discs to electrically attract solid particles in the air through the contacting faces of the discs.

9. The device according to claim 8, wherein said housing includes an inner surface formed with a plurality of axially-extending circumferentially-spaced ribs in contact with the outer edges of said discs, at least one of said ribs including one of said electrical conductors connectible to an electrical voltage source and contacting said terminals of the electrodes in the insulating discs.

10. A filter element, comprising: a disc of insulating material having substantially planer outer faces formed with ribs contactible with ribs on the outer faces of other discs when stacked therewith to define filtering passageways between the contacting faces of the discs; and an electrode layer carried by said disc and covered by the insulating material thereof, said electrode layer being electrically connected to an exposed electrical terminal at one edge of the disc.

11. The filter element according to claim 10, wherein said electrode extends for substantially the complete area of the ribbed faces of the disc.

12. The filter element according to claim 10, wherein said ribs on both faces are of sinuous configuration.

13. The filter element according to claim 10, wherein said ribs on both faces are of annular configuration.

14. The filter element according to claim 10, wherein said disc is of annular configuration.

15. The filter element according to claim 10, wherein said electrode is embedded in the disc.

16. A method of operating an air filter body including a housing having an inlet and an outlet; a plurality of discs of electrically insulating material arranged in a stack within said housing and having ribbed contacting faces defining small filtering passageways between the contacting faces of adjacent discs; each of said discs having an electrode layer insulated by the respective disc from the electrodes of the adjacent disc; each of said electrodes being electrically connected to an electrical terminal at an edge of the respective disc; electrical conductors for connecting the electrical terminals of alternating discs to one side of a voltage source and the electrical terminals of the remaining alternating discs to the other side of said voltage source; and an electrical voltage source connected to said terminals of the electrodes in the insulating discs to electrically attract solid particles in the air to the contacting faces of the discs;

said method of operating the air filter body comprising:

during a filtering mode, directing the air to be filtered into said housing inlet while applying an electrical voltage to said terminals of the electrodes in said insulating discs to thereby attract solid particles in the air to the contacting faces of the discs in the filter body; and during a cleaning mode, directing air into the housing through the housing outlet to reverse flush the filter body while reversing the electrical voltage applied to said terminals to thereby expel the particles from the contacting faces of the filter body discs.

17. The method according to claim 16, wherein the air used for reverse flushing the filter body during the cleaning mode is supplied from a separate source of compressed air.

18. The method according to claim 17, wherein in the cleaning mode, the filter body is first reversed flushed with steam or a liquid spray before being reversely flushed with air.

* * * * *